Figure 1:
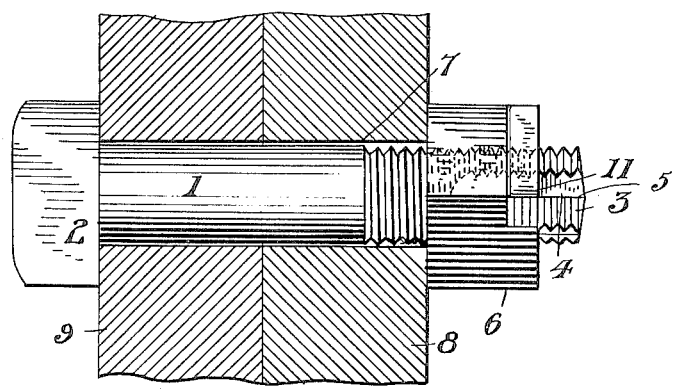

J. SANTARCANGELO.
NUT LOCK.
APPLICATION FILED SEPT. 6, 1911. RENEWED NOV. 22, 1913.

1,089,159.

Patented Mar. 3, 1914.

WITNESSES

INVENTOR
J. Santarcangelo
BY

ATTORNEYS

UNITED STATES PATENT OFFICE.

JOSEPH SANTARCANGELO, OF PITTSBURGH, PENNSYLVANIA.

NUT-LOCK.

1,089,159.

Specification of Letters Patent. Patented Mar. 3, 1914.

Application filed September 6, 1911, Serial No. 647,815. Renewed November 22, 1913. Serial No. 802,585.

*To all whom it may concern:*

Be it known that I, JOSEPH SANTARCANGELO, a citizen of the United States of America, residing at Pittsburgh, in the county of Allegheny and State of Pennsylvania, have invented certain new and useful Improvements in Nut-Locks, of which the following is a specification, reference being had therein to the accompanying drawing.

This invention relates to nut locks and more particularly to an improvement upon the nut lock disclosed in my application for patent Serial No. 644,751, filed August 18th, 1911.

Besides having the same objects in view as disclosed in my pending application, the present invention aims to provide a nut locking device that is more durable, capable of being locked in various positions, and efficient as a device that can be advantageously used in connection with rail joints, bridges, rolling stock and structures subjected to vibrations that have a tendency to displace nuts.

The invention further aims to furnish a nut with double locking elements, either of which can be shifted to engage a bolt to prevent the rearward rotation of the nut upon the bolt.

Figure 2:
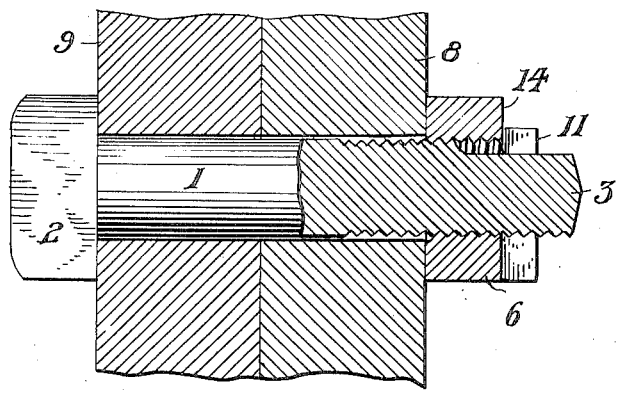
Figure 3:
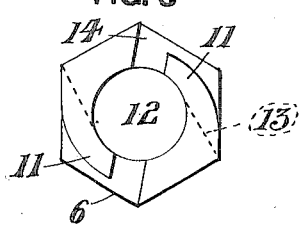
Figure 4:
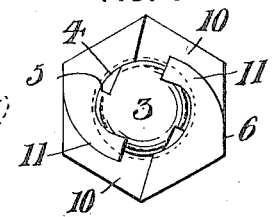
Figure 5:
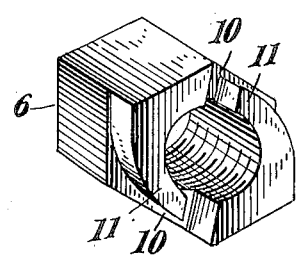

I attain the above objects by a mechanical construction that will be hereinafter specifically described and then claimed, and reference will now be had to the drawing, wherein like numerals denote corresponding parts throughout the several views, in which:

Figure 1 is a side elevation of the nut lock, Fig. 2 is a longitudinal sectional view of the same, Fig. 3 is a front elevation of a detached nut, Fig. 4 is an end view of the nut lock showing the nut in a locked position, and Fig. 5 is a perspective view of a detached nut.

The reference numeral 1 denotes a bolt or tie rod having one end thereof provided with a head 2 and the opposite end thereof screw threaded, as at 3. The screw threaded end 3 is provided with equally spaced longitudinal grooves 4 presenting longitudinal shoulders 5 that are disposed radially relative to the longitudinal axis of the bolt. The grooves 4 are approximately half the length of the threaded portion of the bolt 1, to enable the threaded portion of the nut 6 when screwed upon the bolt, to obtain a purchase upon that part of the threaded portion 3 of the bolt which is not provided with the grooves 4. The bolt 1 is illustrated as extending through alining openings 7 provided therefor in pieces of material 8 and 9, the head 2 of the bolt engaging the piece of material 9 and the nut 6 the piece of material 8.

The nut 6 has its outer face thereof provided with two diametrically opposed transversely extending inclined cut away portions 10 to form a pair of grooves which extend from the outer edge to the inner edge of the nut. Each outer side of the nut is slitted in a diagonal manner, the inner wall of each slit extending from one corner of the nut to the inner end of one of the walls of a groove. The inner walls of said slits extend in parallel planes and are indicated by dotted lines 13. The slitting of the nut in the manner as stated provides a pair of malleable arms 11, the outer faces of which are curved. When slitting the nut, the slits extend through the threaded wall of the bolt opening. In this manner the arms 11 have outer free ends and the opposite ends thereof integral with the nut, whereby a hammer or other instrument can be employed for tapping the free ends of the arms and driving the same inwardly to engage in diametrically opposed grooves 4 of the bolt 1. The free ends of the arms 11 are adapted to engage the shoulders 5 of the bolt and prevent a rearward rotation of the nut upon the bolt.

In practice, the nut 6 is screwed upon the bolt until the threaded bore thereof obtains a purchase upon the threads of the bolt that are not intersected by the grooves 4, and in consequence of this arrangement of the nut, the nut will be more firmly held by the bolt and the danger of the threads thereof being stripped reduced to a minimum.

In the manufacture of the nut 6, I find it advantageous to provide the outer face thereof with a transverse slot 14 and then saw or otherwise cut the nut on a line that extends transversely of two facets of the nut. In other words, the arms 11 are produced by sawing or cutting the nut in two parallel planes, both of which intersect the bore 12 of the nut and provide the free ends of the arms 11 that can be readily bent to engage in the grooves 4 of the bolt.

What I claim is:—

In a nut lock, the combination with a bolt having the threaded portion thereof formed with a series of equally spaced longitudinal grooves of less length than said threaded portion and having their outer termini at the outer terminus of the bolt, a nut having its outer face provided with a transverse recess and further having diametrically opposed pairs of facets slitted inwardly and with the slits extending through the walls of said recess at opposite ends thereof thereby providing oppositely disposed tongues extending toward the other ends of the walls of the recess, said tongues decreasing in width toward their free ends, said tongues adapted to have their free ends driven into diametrically opposed grooves for securing the nuts against unlocking movements.

In testimony whereof I affix my signature in the presence of two witnesses.

JOSEPH SANTARCANGELO.

Witnesses:
MAX H. SROLOVITZ,
CHRISTINA T. HOOD.